United States Patent
Zou et al.

(10) Patent No.: US 12,511,637 B2
(45) Date of Patent: Dec. 30, 2025

(54) METHOD, APPARATUS, AND DEVICE FOR ACCESSING AGGREGATION CODE PAYMENT PAGE, AND MEDIUM

(71) Applicant: ALIPAY.COM CO., LTD., Shanghai (CN)

(72) Inventors: Shengqun Zou, Shanghai (CN); Haojie Zhong, Shanghai (CN); Lingfei Liao, Shanghai (CN)

(73) Assignee: Alipay.com Co., Ltd., Shanghai (CN)

( * ) Notice: Subject to any disclaimer, the term of this patent is extended or adjusted under 35 U.S.C. 154(b) by 91 days.

(21) Appl. No.: 18/569,857

(22) PCT Filed: May 19, 2022

(86) PCT No.: PCT/CN2022/093754
§ 371 (c)(1),
(2) Date: Dec. 13, 2023

(87) PCT Pub. No.: WO2022/267766
PCT Pub. Date: Dec. 29, 2022

(65) Prior Publication Data
US 2024/0273508 A1    Aug. 15, 2024

(30) Foreign Application Priority Data

Jun. 23, 2021 (CN) .................. 202110696177.X

(51) Int. Cl.
*G06Q 20/32* (2012.01)
*G06Q 20/40* (2012.01)

(52) U.S. Cl.
CPC ....... *G06Q 20/3276* (2013.01); *G06Q 20/401* (2013.01)

(58) Field of Classification Search
CPC .................. G06Q 20/3276; G06Q 20/401
See application file for complete search history.

(56) References Cited

U.S. PATENT DOCUMENTS

2011/0137742 A1\* 6/2011 Parikh ............... G06Q 30/0601
                                                      705/26.1
2016/0227367 A1\* 8/2016 Alsehly ................. H04W 4/025
(Continued)

FOREIGN PATENT DOCUMENTS

CN          109286633 A       1/2019
CN          111429128 A       7/2020
(Continued)

OTHER PUBLICATIONS

The International Search Report and Written Opinion of the International Searching Authority for International Application No. PCT/CN2022/093754 mailed on Aug. 16, 2022.

*Primary Examiner* — Raven E Yono
(74) *Attorney, Agent, or Firm* — Womble Bond Dickinson (US) LLP

(57) ABSTRACT

Embodiments of this specification disclose a method, an apparatus, and a device for accessing an aggregation code payment page, and a medium. The solution includes: obtaining, by a first server, an access request sent by a terminal, where the access request is generated by the terminal by scanning a target aggregation code, and the access request includes code information of the target aggregation code and a terminal identifier of the terminal; obtaining a first redirection address corresponding to the code information; sending a payment request for the target aggregation code based on the first redirection address; obtaining target page information of a payment page corresponding to the target aggregation code; and sending the target page information to the terminal.

11 Claims, 3 Drawing Sheets

(56) References Cited

U.S. PATENT DOCUMENTS

| | | | |
|---|---|---|---|
| 2017/0372185 A1* | 12/2017 | Friant | .............. H04L 63/08 |
| 2019/0090133 A1 | 3/2019 | Wang | |
| 2019/0253418 A1 | 8/2019 | Yuan | |
| 2021/0125165 A1* | 4/2021 | Borden | ............. G06Q 20/42 |
| 2022/0215374 A1* | 7/2022 | Lu | ............. G06Q 20/3825 |

FOREIGN PATENT DOCUMENTS

| | | |
|---|---|---|
| CN | 111667262 A | 9/2020 |
| CN | 111861452 A | 10/2020 |
| CN | 113344567 A | 9/2021 |

\* cited by examiner

METHOD, APPARATUS, AND DEVICE FOR ACCESSING AGGREGATION CODE PAYMENT PAGE, AND MEDIUM

CROSS-RELATED APPLICATIONS

This application is a national stage entry of international application no. PCT/CN2022/093754 filed on May 19, 2022, which claims priority to Chinese Application No. 202110696177.X filed on Jun. 23, 2021, which is herein incorporated by reference in its entirety.

TECHNICAL FIELD

This specification relates to the field of computer technologies, and in particular, to a method, an apparatus, and a device for accessing an aggregation code payment page, and a medium.

BACKGROUND

With development of computer technologies, more users make a payment through code scanning. To help a user perform a payment operation and reduce a limitation of a payment method, an aggregation payment code emerges. The aggregation payment code is a collection code into which a plurality of payment channels are integrated, and can simultaneously support payment tools of the integrated channels in making a payment through code scanning. For example, some aggregation payment codes can support mainstream payment tools such as Alipay, WeChat, Baidu Wallet, and UnionPay in making a payment through code scanning.

In the existing technology, after the user scans the aggregation payment code, before displaying a payment page to the user, a management institution, for example, a bank or another institution, of the aggregation payment code needs to make at least one 302 jump, and some banks or institutions even need to make a plurality of 302 jumps. Therefore, a user terminal needs to receive and process a plurality of 302 jumps before the terminal can display the payment page. It can be learned that in the existing technology, the terminal needs to exchange information with the management institution of the aggregation payment code for a plurality of times, to obtain the payment page. However, due to a limitation of a network signal of the terminal, for example, a weak network signal of the terminal, access failure may be caused, and the payment page cannot be successfully obtained. Particularly, when the network signal of the terminal is poor, a success rate of obtaining the payment page by the terminal is lower, and a payment success rate and user experience are affected.

Therefore, it is desired to increase the success rate of obtaining the payment page by the terminal and improve user experience.

SUMMARY

Embodiments of this specification provide a method, an apparatus, and a device for accessing an aggregation code payment page, and a medium, to increase a success rate of obtaining a payment page by a terminal.

The embodiments of this specification are implemented as follows: An embodiment of this specification provides a method for accessing an aggregation code payment page, including: obtaining, by a first server, an access request sent by a terminal, where the access request is generated by the terminal by scanning a target aggregation code, and the access request includes code information of the target aggregation code and a terminal identifier of the terminal; obtaining a first redirection address corresponding to the code information, where the first redirection address is an access address specified by a second server that manages the target aggregation code; sending a payment request for the target aggregation code based on the first redirection address; obtaining target page information of a payment page corresponding to the target aggregation code; and sending the target page information to the terminal.

An embodiment of this specification provides an apparatus for accessing an aggregation code payment page, including: a request obtaining module, configured to obtain an access request sent by a terminal, where the access request is generated by the terminal by scanning a target aggregation code, and the access request includes code information of the target aggregation code and a terminal identifier of the terminal; a first address obtaining module, configured to obtain a first redirection address corresponding to the code information, where the first redirection address is an access address specified by a server that manages the target aggregation code; a request sending module, configured to send a payment request for the target aggregation code based on the first redirection address; an information obtaining module, configured to obtain target page information of a payment page corresponding to the target aggregation code; and an information sending module, configured to send the target page information to the terminal.

An embodiment of this specification provides a device for accessing an aggregation code payment page, including at least one processor and a storage communicatively connected to the at least one processor. The storage stores instructions that can be executed by the at least one processor. The instructions are executed by the at least one processor, to enable the at least one processor to perform the following operations: obtaining an access request sent by a terminal, where the access request is generated by the terminal by scanning a target aggregation code, and the access request includes code information of the target aggregation code and a terminal identifier of the terminal; obtaining a first redirection address corresponding to the code information, where the first redirection address is an access address specified by a second server that manages the target aggregation code; sending a payment request for the target aggregation code based on the first redirection address; obtaining target page information of a payment page corresponding to the target aggregation code; and sending the target page information to the terminal.

An embodiment of this specification provides a computer-readable medium. The computer-readable medium stores computer-readable instructions. The computer-readable instructions can be executed by a processor to implement the method for accessing an aggregation code payment page.

In the embodiments of this specification, the following beneficial effects can be achieved: The first server can receive the access request that is sent by the terminal and that includes the code information, access, based on the code information, the redirection address specified by the second server, send the payment request, then obtain the target page information of the payment page corresponding to the target aggregation code, and send the obtained page information to the terminal. The first server can interact with the second server to obtain the target page information of the payment page. In this way, information exchange performed by the terminal can be reduced, and further a case in which the payment page cannot be successfully obtained due to a reason such as a network of the terminal can be reduced, and a success rate of an aggregation payment can be increased.

In addition, the first server can send the payment request based on the first redirection address, and the terminal does not need to access the redirection address. In this way, a case in which the terminal displays another jump page before displaying the final payment page can be avoided, and user experience can be improved.

BRIEF DESCRIPTION OF DRAWINGS

To describe the technical solutions in the embodiments of this specification or in the existing technology more clearly, the following briefly describes the accompanying drawings needed for describing the embodiments or the existing technology. Clearly, the accompanying drawings in the following description merely show some embodiments of this specification, and a person of ordinary skill in the art can still derive other drawings from these accompanying drawings without creative efforts.

DESCRIPTION OF EMBODIMENTS

To enable a person skilled in the art to practice one or more embodiments of this specification, the following clearly and comprehensively describes the technical solutions in the one or more embodiments of this specification with reference to corresponding accompanying drawings and specific embodiments of this specification. Clearly, the described embodiments are merely some but not all of the embodiments of this specification. All other embodiments obtained by a person of ordinary skill in the art based on the embodiments of this specification without creative efforts shall fall within the protection scope of the one or more embodiments of this specification.

The technical solutions provided in the embodiments of this specification are described in detail below with reference to the accompanying drawings.

In the existing technology, after a user scans an aggregation payment code, a terminal interacts with a server of a management institution of the aggregation payment code, to obtain a payment page provided by the server. For example, before displaying the payment page to the user, a bank or another management institution of the aggregation payment code needs to make at least one 302 jump, and some banks or institutions even need to make a plurality of 302 jumps. Therefore, the user terminal needs to receive and process a plurality of 302 jumps before the terminal can display the payment page. For the plurality of 302 jumps, before the terminal displays the final payment page, a plurality of automatic page jumps may occur. In the existing technology, the terminal needs to exchange information with the server of the management institution of the aggregation payment code for a plurality of times, to obtain the payment page. However, due to a limitation of a network signal of the terminal, for example, a weak network signal of the terminal, access failure may be caused due to a reason such as an access timeout, and the terminal cannot successfully obtain the payment page. Consequently, a success rate of obtaining the payment page by the terminal is lower, and a payment success rate and user experience are affected.

The 302 jump is a type of web address redirection, and represents a temporary direction of a web address and temporary redirection to another web address.

The aggregation payment code is a collection code into which a plurality of payment channels are integrated, and can be briefly referred to as an aggregation code.

Figure 1:
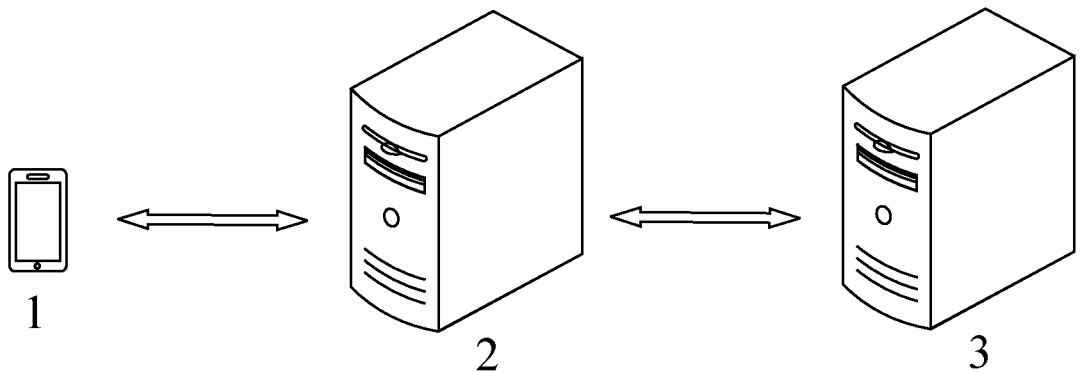
FIG. 1 is a schematic diagram of an application scenario of a method for accessing an aggregation code payment page according to an embodiment of this specification.

To resolve a disadvantage in the existing technology, the following embodiments are provided in the solution: FIG. 1 is a schematic diagram of an application scenario of a method for accessing an aggregation code payment page according to an embodiment of this specification. As shown in FIG. 1, the solution can include a terminal 1, a first server 2, and a second server 3. In actual application, a user scans an aggregation code by using an application with a payment function in the terminal 1, and the first server 2 corresponding to the application can receive code information of the aggregation code scanned by the terminal 1. Based on the code information, the first server 2 obtains a redirection address specified by the second server 3, and can send a payment request for the aggregation code to the second server 3 based on the redirection address, to request to make a payment by using the application that scans the aggregation code in the terminal. The second server 3 or another server specified by the second server 3 can generate, based on the request sent by the first server 2, a payment page corresponding to the aggregation code. The first server 2 can obtain the payment page, and send the payment page to the terminal 1, so that the user can enter information such as a payment amount on the payment page, to complete a payment.

In an entire process, the terminal may not interact with the second server, and does not need to process the redirection address specified by the second server in a process of obtaining the payment page. In this way, a case in which the terminal processes a redirection page jump can be avoided, and further a probability that the payment page cannot be successfully obtained due to a reason such as an excessively large quantity of times of interaction between the terminal and the second server or a network of the terminal can be reduced, and a success rate of an aggregation payment can be increased.

Figure 2:
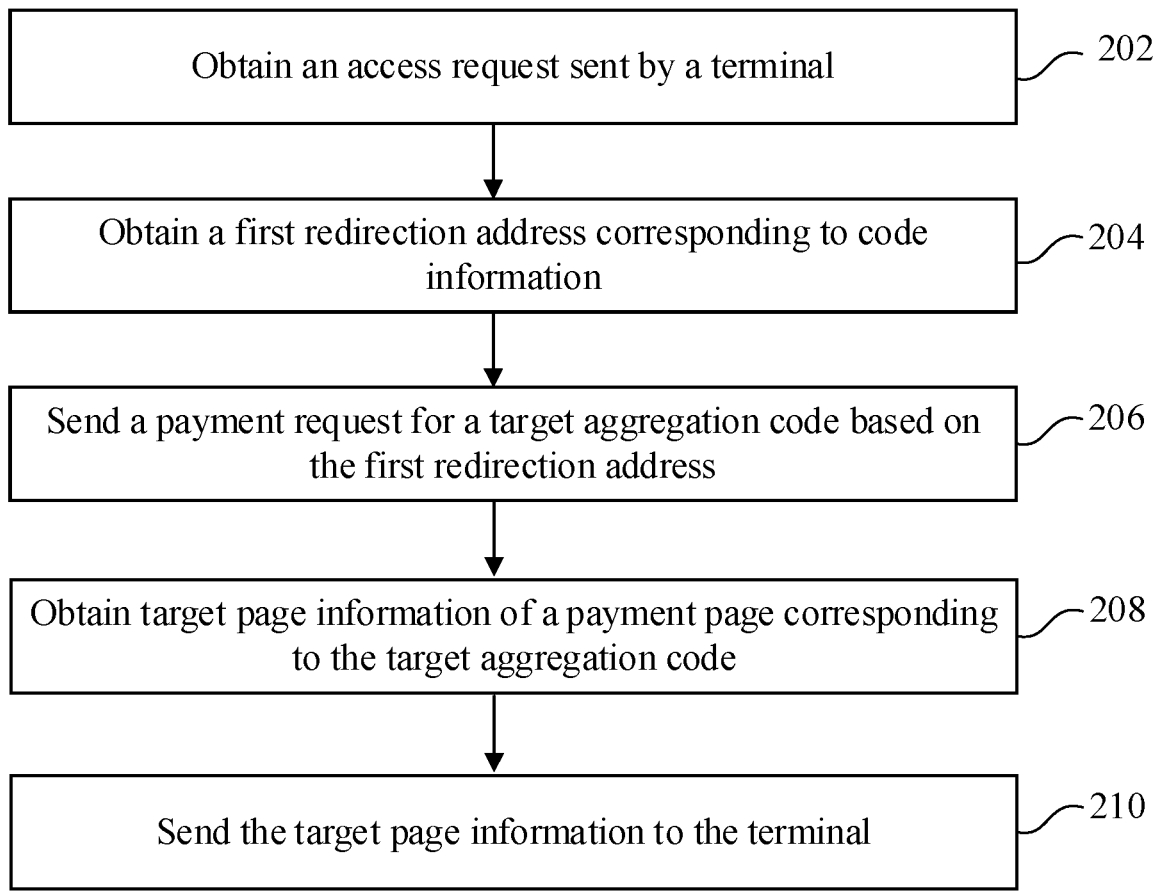
FIG. 2 is a schematic flowchart of a method for accessing an aggregation code payment page according to an embodiment of this specification.

The method for accessing an aggregation code payment page provided in the embodiments of this specification is described in detail below with reference to the accompanying drawings. FIG. 2 is a schematic flowchart of a method for accessing an aggregation code payment page according to an embodiment of this specification. From a program perspective, the procedure can be performed by a program loaded on an application server.

As shown in FIG. 2, the procedure can include the following steps: Step 202: A first server obtains an access request sent by a terminal, where the access request is generated by the terminal by scanning a target aggregation code, and the access request includes code information of the target aggregation code and a terminal identifier of the terminal.

In actual application, a user can scan the target aggregation code by using an application with a payment function in the terminal, and the first server can be a server corresponding to the application that scans the target aggregation code, and the first server can process a task related to the application. The target aggregation code can be a collection code provided by a payee, and the user can select a payment method supported by the target aggregation code to make a payment.

After the terminal scans the target aggregation code, the first server can obtain the access request that includes the code information and the terminal identifier of the terminal. The access request can be a request used to access a payment page.

Step 204: Obtain a first redirection address corresponding to the code information, where the first redirection address is an access address specified by a second server that manages the target aggregation code.

In this embodiment of this specification, the terminal or the first server parses the code information of the target aggregation code, to obtain the first redirection address specified by the second server, and the second server can generate, based on the first redirection address accessed by the first server, a payment page corresponding to the target aggregation code scanned by the terminal.

The second server can be a server that manages the target aggregation code. Alternatively, the second server can be an independent server, a server cluster, or a server in a server cluster. Descriptions are provided here in terms of a function, and a specific form is not limited here.

Step 206: Send a payment request for the target aggregation code based on the first redirection address.

The first server can access the first redirection address, and send the payment request for the target aggregation code. The second server can perform further payment request processing based on access of the first server.

Step 208: Obtain target page information of the payment page corresponding to the target aggregation code.

Step 210: Send the target page information to the terminal.

In this embodiment of this specification, the first server can interact with the second server to obtain the target page information of the payment page, and send the target page information to the terminal. The terminal can send the code information of the target aggregation code to the first server, to obtain the payment page information obtained after the first server interacts with the second server. The terminal neither needs to interact with the second server based on the code information of the target aggregation code, nor needs to process one or more redirection addresses in a process of obtaining the page information.

It should be understood that in the method described in one or more embodiments of this specification, sequences of some steps in the method can be exchanged with each other based on an actual requirement, or some steps in the method can be omitted or deleted.

In the method in FIG. 2, the first server can receive the access request that is sent by the terminal and that includes the code information, access, based on the code information, the redirection address specified by the second server, send the payment request, then obtain the target page information of the payment page corresponding to the target aggregation code, and send the obtained page information to the terminal. The first server can interact with the second server to obtain the target page information of the payment page. In this way, information exchange performed by the terminal can be reduced, and further a case in which the payment page cannot be successfully obtained due to a reason such as a network of the terminal can be reduced, and a success rate of an aggregation payment can be increased.

In addition, the first server can send the payment request based on the first redirection address, and the terminal does not need to access the redirection address. In this way, a case in which the terminal displays another jump page before displaying the final payment page can be avoided, and user experience can be improved.

Based on the method in FIG. 2, an embodiment of this specification further provides some specific implementations of the method, which are described below.

Optionally, in this embodiment of this specification, before the target page information of the payment page corresponding to the target aggregation code is obtained in step 208, the method can include: receiving a first request used to obtain account information of a payment account, where the first request includes a second redirection address, the second redirection address is generated based on the first redirection address, and the second redirection address corresponds to a payment application provided by the first server; and sending an authorization code of the payment account to the second redirection address.

In actual application, a server that provides the payment page information needs to obtain some information about a payer to generate the payment page for making a payment by the payer. In this embodiment of this specification, after the first server accesses the second server based on the first redirection address, the second server can request the account information of the payment account from the first server. After receiving the request of the second server, the first server can provide the pre-generated authorization code of the payment account to the second server, and the second server can obtain the account information of the payment account based on the authorization code. The authorization code can be an identifier agreed upon in advance between the second server and the first server, and is used to indicate that the payment account is allowed to make a payment by using the target aggregation code. There is a one-to-one correspondence between the authorization code and the payment account. In actual application, the authorization code can include one or more characters. A specific form is not limited here.

In this embodiment of this specification, the second server can generate the second redirection address based on the first redirection address accessed by the first server, and obtain the authorization code of the payment account by using the second redirection address. After receiving the second redirection address, the first server accesses the second redirection address, and sends the authorization code of the payment account.

In actual application, the second redirection address can point to a server that generates the payment page of the target aggregation code, and the server can be a server with a payment page generation function. When the second server has a payment page generation function, the second server can be a server that generates the payment page, and the second redirection address can point to the second server. Specific server division is not limited here. For ease of subsequent description, the server to which the second redirection address points is referred to as a third server here.

After obtaining the authorization code, the third server can verify the payment account, determine that the payment account can be used to make a payment by using the target aggregation code, and can further generate the payment page based on the authorization code.

In actual application, the third server can obtain identification information of the payment account from the first server based on the authorization code. Therefore, the third server can determine a party that is making a payment, so that a subsequent payment process can be successfully completed.

In this embodiment of this specification, after receiving the authorization code sent by the first server, the third server can further send a request used to obtain an account identifier of the payment account to the first server. The request can include the authorization code. The first server can determine the payment account and the account identifier of the payment account based on the authorization code, and send the account identifier to the third server, so that the third server can generate page information for the payment account based on the account identifier of the payment account.

In the existing technology, after the terminal scans the target aggregation code, information exchange with the second server and/or the third server is usually performed by using a browser of the terminal. When the third server needs to obtain the account information of the payment account, the terminal needs to first send a request for obtaining the account information of the payment account to the first server. The first server searches a database of the first server for the authorization code of the payment account based on the request of the terminal, and sends the authorization code of the payment account to the terminal, and then the terminal sends the authorization code to the third server. In this embodiment of this specification, the first server can directly send the determined authorization code to the third server, and the terminal does not need to perform processing. In this way, a case in which the payment page cannot be obtained because data is interrupted due to a problem such as a network of the terminal can be avoided, a data transmission path can be reduced to improve transmission efficiency, and efficiency of an aggregation payment can be improved. In addition, the terminal does not need to access the second redirection address, that is, does not need to make a 302 page jump, and the terminal does not make a redundant page jump. This can also improve user experience.

In actual application, the server of the target aggregation code may need to make a plurality of 302 jumps before the payment page is generated. For example, when a collection account corresponding to the target aggregation code is a collection account of the payee in a bank, the server that manages the target aggregation code can be a UnionPay server. The UnionPay can manage services of a plurality of banks. For each bank, a different access address can be set. If the collection account of the payee is a bank A, the UnionPay server can generate a redirection address of a server that is specified to manage a task of the bank A, so that the server that manages the task of the bank A processes a related task of the target aggregation code. In actual application, the server that manages the task of the bank A can be a subserver in the UnionPay server, or can be a server located in the same server cluster as the UnionPay server. A specific form is not limited here.

In this embodiment of this specification, before the first request used to obtain the account information of the payment account is received, the method can further include:

A second request that includes a third redirection address is received, where the third redirection address points to a management institution of a collection account corresponding to the target aggregation code, and the third redirection address is generated based on the first redirection address; and the third redirection address is accessed, where the third redirection address is used to generate the second redirection address.

For ease of description, the management institution of the collection account corresponding to the target aggregation code specified by the third redirection address is represented as a fourth server here. In this embodiment of this specification, the second server can generate, based on the first redirection address accessed by the first server, the third redirection address that points to the fourth server, and feed back the third redirection address to the first server. The first server accesses the third redirection address. The fourth server can further generate the second redirection address based on the third redirection address accessed by the first server, so that the first server can obtain the payment page information.

In this embodiment of this specification, the first server can access the third redirection address, so that the terminal does not need to access the third redirection address, and a page jump generated because the terminal accesses the third redirection address is not displayed in the terminal, to improve user experience.

It can be understood that the second redirection address and the third redirection address are examples used to describe the solution in this embodiment of this specification. In actual application, the server of the target aggregation code may generate a plurality of redirection addresses in a process of generating the payment page. The plurality of redirection addresses are not described one by one here.

In this embodiment of this specification, all redirection addresses in the process of obtaining the payment page can be accessed by the first server, and the terminal does not need to perform access, so that the terminal does not need to process the redirection address, that is, does not need to process a 302 jump. It can be understood that in this embodiment of this specification, the first server processes the redirection jump that should be processed by the terminal. In an implementation, the first server can simulate an http request to the server of the target aggregation code. For example, a built-in browser can be set in the first server to simulate an http request to the second server, the third server, and the fourth server, to process a redirection jump that needs to be processed by a browser of the terminal in the existing technology, so as to reduce interaction of the terminal, and increase a success rate of an aggregation payment.

In this embodiment of this specification, the first server can determine the authorization code of the payment account based on the terminal identifier. Specifically, the sending an authorization code of the payment account to the second redirection address can specifically include: determining, based on the terminal identifier of the terminal, a target payment account currently logged in on the terminal; determining a target authorization code corresponding to the target payment account; and sending the target authorization code to the second redirection address.

In actual application, the server that generates the payment page can feed back the payment page information to the first server by accessing the address. In this embodiment of this specification, before the target page information of the payment page corresponding to the target aggregation code is obtained, the method can further include: receiving a payment page address generated based on the authorization code. The obtaining target page information of the payment page corresponding to the target aggregation code specifically includes: obtaining the target page information based on the payment page address.

The payment page address can be generated based on information such as payee information (for example, a merchant name) and payer information (for example, a payment account identifier) by the server that generates the payment page. The payment page address usually corresponds to a payment method. In implementation application, the target page information of the payment page can include information such as a name of a collection merchant and a name of the management institution of the target aggregation code. The server that generates the payment page can further determine some marketing content based on information about two transaction parties, and can further include the marketing content in the target page information of the payment page. Specific content displayed on the payment page is not limited here.

In actual application, when different users or the same user scans the target aggregation code by using an application of the first server, the same second redirection address may be obtained. The second redirection address can be considered as a static access address. To obtain the payment page address more quickly, when it is determined that the second redirection address is a static access address, the first server can directly access the second redirection address after obtaining the code information provided by the terminal, and send the authorization code, to reduce a workload of the first server. For example, when the second redirection address is an address generated based on the third redirection address, the first server can no longer access the third redirection address, to increase a speed of obtaining the payment page information. Specifically, the access method provided in this embodiment of this specification can further include: obtaining a plurality of historical second redirection addresses received within a preset time period; determining whether all historical second redirection addresses in the plurality of historical second redirection addresses are consistent; and if all the historical second redirection addresses in the plurality of historical second redirection addresses are consistent, storing the historical second redirection address, the code information of the target aggregation code, and a correspondence between the code information and the historical second redirection address in a preset database.

The preset time period can be a time period before a time period in which the code information sent by the terminal is obtained, and a specific time can be set based on a requirement. For example, the preset time period can be one year, a few months, or a time period from a time in which the request for the target aggregation code is received from the first server for the first time to a time in which the code information sent by the terminal is currently obtained. The historical second redirection address can be a second redirection address that is received when the first server processes a previous process in which the terminal or another terminal scans the target aggregation code to make a payment and that is used to obtain an authorization code of a historical payment account in the terminal or the another terminal. The preset database can be a unit, for example, a hard disk or a cloud disk, having a storage function, or can be a blockchain system. A specific type is not limited here provided that the historical second redirection address, the code information of the target aggregation code, and the correspondence between the code information and the historical second redirection address can be stored.

The first server can collect statistics on the plurality of historical second redirection addresses received within the preset time period, compare the plurality of historical second redirection addresses, and determine whether all the historical second redirection addresses are consistent. If all the historical second redirection addresses are consistent, it can be considered that the second redirection address corresponding to the target aggregation code is a static address, that is, the same second redirection address is obtained when the target aggregation code is used for a plurality of times to make a payment. A correspondence between the target aggregation code and the historical second redirection address can be stored, so that the payment page information of the target aggregation code can be subsequently obtained by accessing the historical second redirection address.

In this embodiment of this specification, before the payment request for the target aggregation code is sent based on the first redirection address, the method can include: determining, based on the code information, whether the preset database includes the code information.

If the preset database includes the code information, the preset database is searched for the historical second redirection address corresponding to the code information; and the authorization code of the payment account is sent based on the historical second redirection address corresponding to the code information. The sending a payment request for the target aggregation code based on the first redirection address can specifically include: if the preset database does not include the code information, sending the payment request for the target aggregation code based on the first redirection address.

In this embodiment of this specification, the determining whether the preset database includes the code information can specifically include: searching the preset database for the code information based on a regular expression, to obtain a search result; and determining, based on the search result, whether the preset database includes the code information.

In this embodiment of this specification, the preset database can be searched for the code information based on the regular expression, and if the code information is found, it can be determined that the preset database includes the code information, and the historical second redirection address corresponding to the code information can be further determined. The regular expression can be set based on a manner of forming the code information. For example, a first regular expression can be set based on a domain name of the code information, a second regular expression can be set based on a resource path of the domain name of the code information, and information corresponding to a domain name the same as that corresponding to the code information is queried in the preset database based on the first regular expression. If the information can be found, the code information with the same domain name is searched, based on the second regular expression, for a resource path the same as that of the domain name of the code information of the target aggregation code.

In this embodiment of this specification, for a target aggregation code of a preset agency, payment page information can be further obtained in a manner in which the first server interacts with a server of the target aggregation code. For example, for a target aggregation code provided by some partners that have a good cooperation relationship with the first server, to improve experience of the user for the target aggregation code, the first server can interact with a server of the target aggregation code to obtain payment page information, to improve efficiency of obtaining a payment page, and improve user experience.

Optionally, in this embodiment of this specification, after the first server obtains the access request sent by the terminal, the method further includes: determining, based on the code information, whether the server that manages the target aggregation code is a server of a preset agency, to obtain a first determining result; and if the first determining result indicates that the second server is not the server of the preset agency, returning the code information to the terminal, so that the terminal obtains the target page information based on the code information by using a terminal browser. The sending a payment request for the target aggregation code specifically includes: if the first determining result indicates that the second server is the server of the preset agency, sending the payment request for the target aggregation code based on the first redirection address.

In actual application, for an area with a relatively poor network condition, an area with dense terminal users, or the like, the first server replaces the terminal to interact with the second server. For example, after the first server obtains the access request sent by the terminal, the method can further include: obtaining location information of the terminal; determining, based on the location information of the terminal, whether the terminal is located in a preset area; and if the terminal is located in the preset area, sending, by the first server, the payment request for the target aggregation code based on the first redirection address; or if the terminal is located outside the preset area, returning the code information to the terminal, so that the terminal obtains the target page information based on the code information by using the terminal browser.

In this embodiment of this specification, the first server can be connected to a network in a wired connection manner. Compared with a manner, in the existing technology, in which the terminal interacts with the server of the target aggregation code through a wireless network, a network of the first server is more stable. Each request is processed based on a stable network, so that a probability that each request is successfully processed can be increased, to increase a success rate of obtaining the payment page information.

In this embodiment of this specification, the first server can communicate with the second server through a preset communication channel, and a bandwidth value of the preset communication channel is greater than or equal to a preset bandwidth value. The preset communication channel can be a dedicated communication channel of the first server. The bandwidth value of the preset communication channel can be set by the second server. Communication between the first server and the second server is processed through the preset communication channel, to avoid impact that is exerted on processing of the task of the target aggregation code and that exists when the first server and/or the second server process/processes another task, and improve efficiency of obtaining the target page information.

It can be understood that the second server, the server to which the second redirection address points, and the server to which the third redirection address points and that is of the management institution of the collection account corresponding to the target aggregation code can be the same server, or can be different servers in the same server cluster. This is merely logical function here, and a specific form of the server is not limited here. The preset communication channel can process interaction information between the first server and each of the server to which the second redirection address points and the server to which the third redirection address points.

In this embodiment of this specification, in a process of obtaining the payment page of the aggregation code, an access step that needs to be performed by the terminal in the existing technology is performed by the first server. For example, in this embodiment of this specification, the first server replaces the terminal in accessing the redirection address, and replaces the terminal in sending the account information of the payment account such as the authorization code to the second server. In this embodiment of this specification, a terminal side is mainly improved. For the second server, the second server can further process information in an existing manner. Therefore, in this embodiment of this specification, obtaining of the payment page information by the terminal can be optimized without changing a processing manner of the second server, and without changing the second server, the method in this embodiment of this specification can reduce costs and efficiency of increasing a success rate of an aggregation payment.

Figure 3:
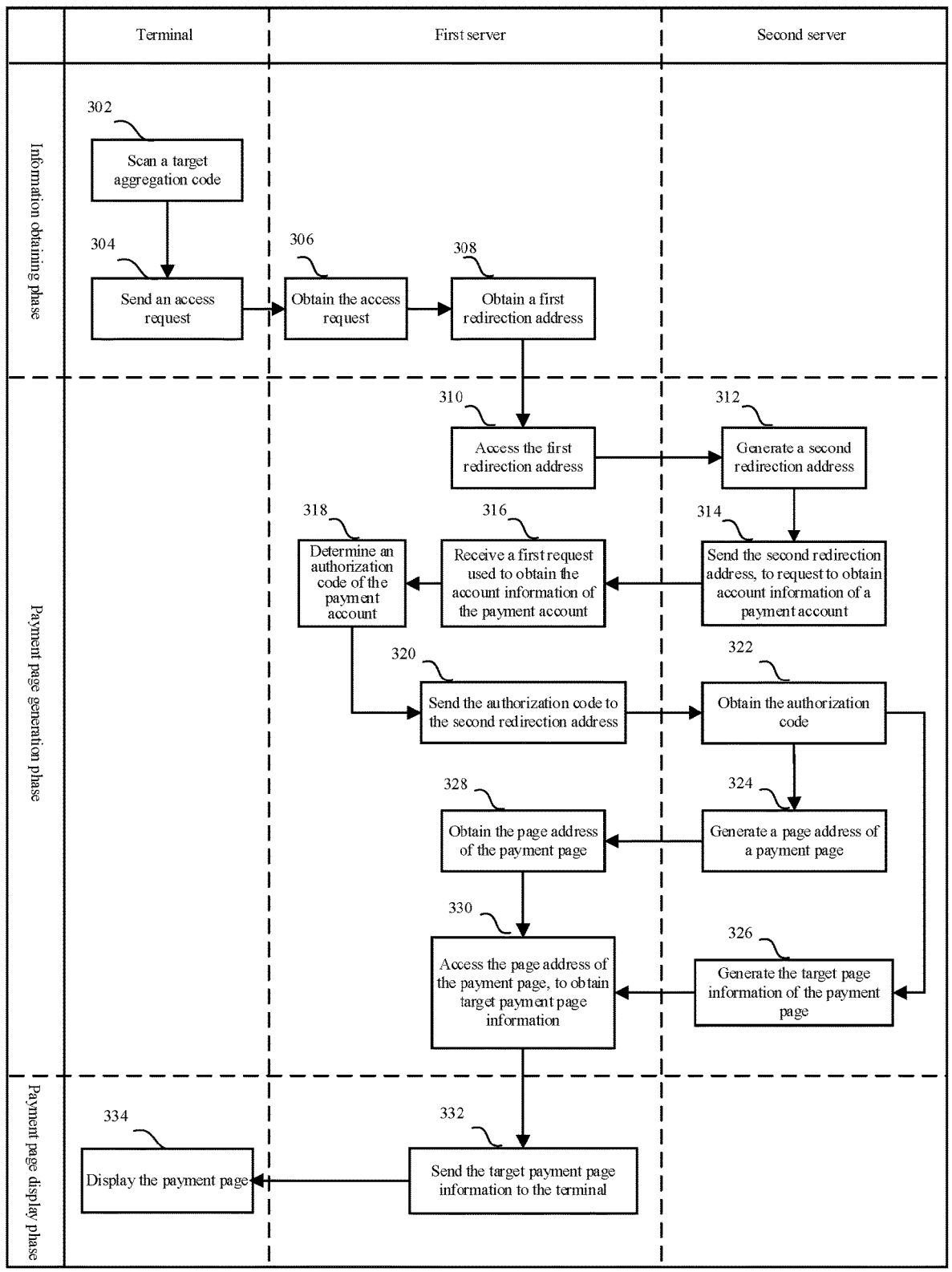
FIG. 3 is a lane diagram of a method for accessing an aggregation code payment page according to an embodiment of this specification.

To more clearly describe the method for accessing an aggregation code payment page provided in the embodiments of this specification, FIG. 3 is a lane diagram of a method for accessing an aggregation code payment page according to an embodiment of this specification. As shown in FIG. 3, the method can include an information obtaining phase, a payment page generation phase, and a payment page display phase, and can specifically include the following steps: Step 302: A terminal scans a target aggregation code.

For example, during shopping settlement, a user can make a payment by scanning an aggregation code provided by a merchant, and the user can select any payment method supported by the aggregation code to make a payment. If the aggregation code supports a payment method A, the user can scan the aggregation code by using an application that can provide the payment method A in the terminal. When the user scans the aggregation code by using the application, the user is usually in a state of logging in to the application. When the user does not log in to the application, the user can be prompted to log in to the application before scanning the code. The terminal can be a mobile terminal such as a smartphone, a smartwatch, or a computer.

Step 304: The terminal can generate an access request based on the scanned target aggregation code, and send the access request to a first server. When the user scans the target aggregation code by using the application in the terminal, the first server can be a server corresponding to the application, and the first server can process a related task of the application.

Step 306: The first server obtains the access request sent by the terminal.

Step 308: Obtain a first redirection address by using code information that is of the target aggregation code and that is included in the access request. In actual application, a server that generates the target aggregation code can include the first redirection address in the target aggregation code, and the first server can identify the first redirection address included in the target aggregation code.

Step 310: Access the first redirection address, and send a payment request for the target aggregation code to a server to which the first redirection address points. In this embodiment of this specification, a second server that manages the target aggregation code can process a task related to the target aggregation code, and the first redirection address can point to the second server.

Step 312: The second server generates a second redirection address based on the first redirection address accessed by the first server.

Step 314: Send the second redirection address to the first server, to request to obtain account information of a payment account.

Step 316: The first server receives a first request used to obtain the account information of the payment account.

Step 318: Determine, based on a terminal identifier, a payment account currently logged in on the terminal, and determine an authorization code corresponding to the target payment account.

Step 320: Access the second redirection address, and send the authorization code of the payment account to the second redirection address.

Step 322: The second server obtains the authorization code of the payment account sent by the first server.

Step 324: Generate, based on the authorization code, a page address of a payment page corresponding to the target aggregation code. The second server can further send a request for obtaining an account identifier of the payment account to the first server based on the authorization code. The first server can feed back the account identifier of the payment account to the second server based on the authorization code. The account identifier of the payment account can be used to distinguish between the payment account and an identifier of another payment account, and the account identifier of the payment account may not be specific account information of the payment account. In this way, the first server does not need to provide specific account information of the payment account to the second server, to ensure information security of the payment account. In addition, the second server can make a distinction between the account identifier of the payment account and another payment account, and perform transaction processing based on the account identifier.

Step 326: The second server can further generate target page information of the payment page based on the authorization code, where the target page information can be stored at a page address of the generated payment page.

In actual application, the target page information can include information such as payee information and a payment amount input box, and can further include marketing information for a payer and the like. For example, the second server can further determine historical transaction information of the payment account based on the account identifier of the payment account, and recommend some marketing activities, coupons, and the like for the payer based on the historical transaction information. The content can also be displayed on the payment page.

Step 328: The first server obtains the page address of the payment page.

Step 330: Access the page address of the payment page, to obtain the target page information of the payment page corresponding to the target aggregation code.

Step 332: Send the target page information to the terminal.

Step 334: The terminal receives the target page information sent by the first server, and displays the payment page, so that the user can make a payment on the payment page.

Figure 4:
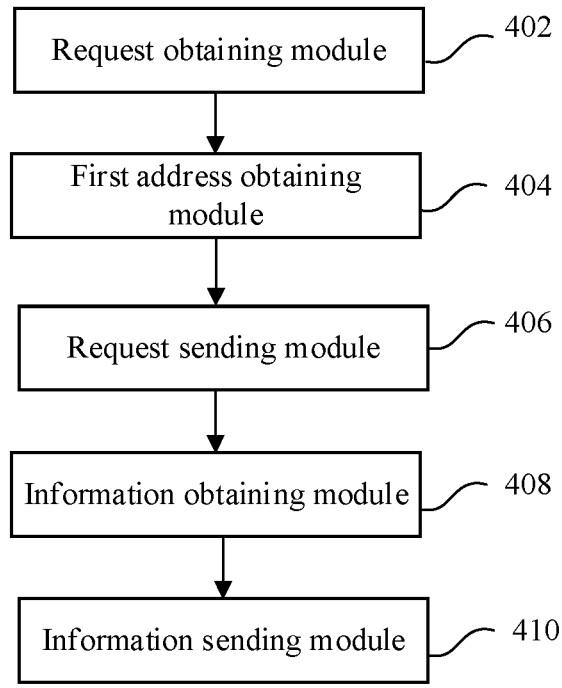
FIG. 4 is a schematic diagram of a structure of an apparatus for accessing an aggregation code payment page according to an embodiment of this specification.

Based on the same idea, an embodiment of this specification further provides an apparatus corresponding to the above-mentioned method. FIG. 4 is a schematic diagram of a structure of an apparatus for accessing an aggregation code payment page according to an embodiment of this specification. As shown in FIG. 4, the apparatus can include: a request obtaining module 402, configured to obtain an access request sent by a terminal, where the access request is generated by the terminal by scanning a target aggregation code, and the access request includes code information of the target aggregation code and a terminal identifier of the terminal; a first address obtaining module 404, configured to obtain a first redirection address corresponding to the code information, where the first redirection address is an access address specified by a server that manages the target aggregation code; a request sending module 406, configured to send a payment request for the target aggregation code based on the first redirection address; an information obtaining module 408, configured to obtain target page information of a payment page corresponding to the target aggregation code; and an information sending module 410, configured to send the target page information to the terminal.

Based on the apparatus in FIG. 4, an embodiment of this specification further provides some specific implementations of the apparatus, which are described below.

Optionally, the apparatus for accessing an aggregation code payment page provided in this embodiment of this specification can further include a second address obtaining module, which can be specifically configured to receive a first request used to obtain account information of a payment account, where the first request includes a second redirection address, the second redirection address is generated based on the first redirection address, and the second redirection address corresponds to a payment application provided by the first server; and send an authorization code of the payment account to the second redirection address.

Optionally, the apparatus can further include a third address obtaining module, which can be specifically configured to receive a second request that includes a third redirection address, where the third redirection address points to a management institution of a collection account corresponding to the target aggregation code, and the third redirection address is generated based on the first redirection address; and access the third redirection address, where the third redirection address is used to generate the second redirection address.

Based on the same idea, an embodiment of this specification further provides a device corresponding to the above-mentioned method.

Figure 5:
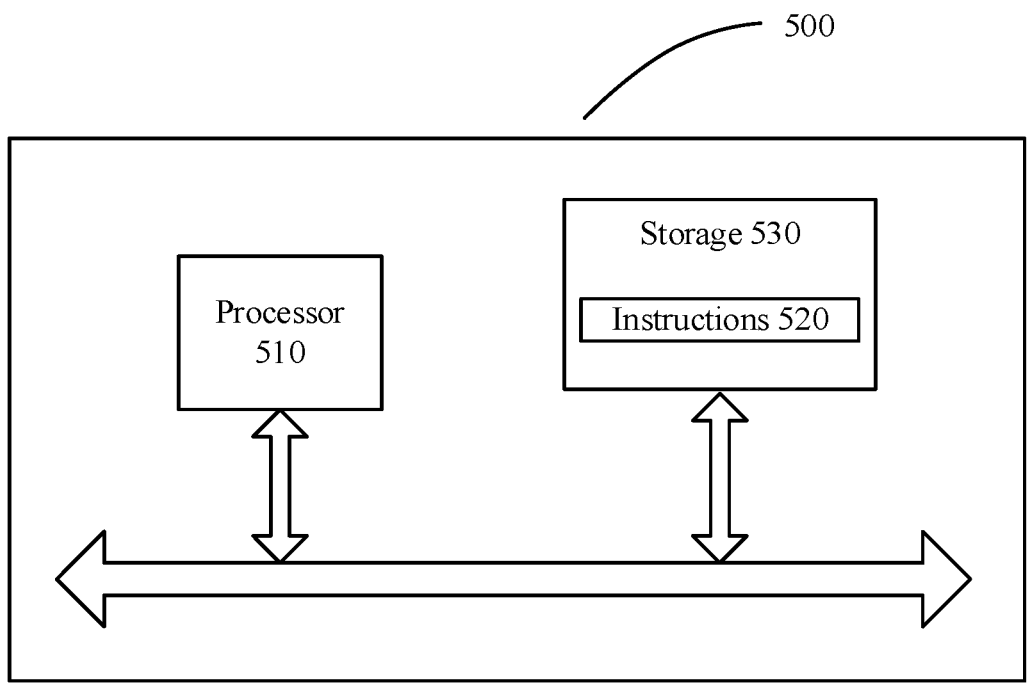
FIG. 5 is a schematic diagram of a structure of a device for accessing an aggregation code payment page according to an embodiment of this specification.

FIG. 5 is a schematic diagram of a structure of a device for accessing an aggregation code payment page according to an embodiment of this specification. As shown in FIG. 5, the device 500 can include at least one processor 510 and a storage 530 communicatively connected to the at least one processor. The storage 530 stores instructions 520 that can be executed by the at least one processor 510. The instructions are executed by the at least one processor 510, to enable the at least one processor 510 to perform the following operations: obtaining an access request sent by a terminal, where the access request is generated by the terminal by scanning a target aggregation code, and the access request includes code information of the target aggregation code and a terminal identifier of the terminal; obtaining a first redirection address corresponding to the code information, where the first redirection address is an access address specified by a second server that manages the target aggregation code; sending a payment request for the target aggregation code based on the first redirection address; obtaining target page information of a payment page corresponding to the target aggregation code; and sending the target page information to the terminal.

Based on the same idea, an embodiment of this specification further provides a computer-readable medium corresponding to the above-mentioned method. The computer-readable medium stores computer-readable instructions. The computer-readable instructions can be executed by a processor to implement the method for accessing an aggregation code payment page.

The embodiments of this specification are described in a progressive manner. For the same or similar parts of the embodiments, references can be made to the embodiments. Each embodiment focuses on a difference from other embodiments. Particularly, the device shown in FIG. 5 is basically similar to the method embodiment, and therefore is briefly described. For related parts, references can be made to some descriptions in the method embodiments.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. Almost all designers program an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and manufacture an application-specific integrated circuit chip. In addition, at present, instead of manually manufacturing an integrated circuit chip, such programming is mostly implemented by using "logic compiler" software. The "logic compiler" software is similar to a software compiler used to develop and write a program. Original code needs to be written in a particular programming language before being compiled. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). At present, the Very-High-Speed Integrated Circuit Hardware Description Language (VHDL) and Verilog are most commonly used. It should also be clear to a person skilled in the art that a hardware circuit for implementing a logical method procedure can be easily obtained by performing slight logic programming on the method procedure by using the above-mentioned several hardware description languages and programming the method procedure into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The storage controller can also be implemented as a part of the control logic of the storage. A person skilled in the art also knows that in addition to implementing the controller by using only the computer-readable program code, logic programming can be performed on method steps to enable the controller to implement the same function in forms of the logic gate, the switch, the application-specific integrated circuit, the programmable logic controller, the built-in microcontroller, and the like. Therefore, the controller can be considered as a hardware component, and an apparatus that is configured to implement various functions and that is included in the controller can also be considered as a structure in the hardware component. Alternatively, an apparatus configured to implement various functions can even be considered as both a software module implementing the method and a structure in the hardware component.

The system, apparatus, module, or unit illustrated in the above-mentioned embodiments can be specifically implemented by using a computer chip or an entity, or can be implemented by using a product having a specific function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the above-mentioned apparatus is described by dividing functions into various units. Certainly, when this specification is implemented, functions of the units can be implemented in one or more pieces of software and/or hardware.

A person skilled in the art should understand that the embodiments of this specification can be provided as methods, systems, or computer program products. Therefore, this specification can use a form of hardware only embodiments, software only embodiments, or embodiments with a combination of software and hardware. In addition, this specification can use a form of a computer program product that is implemented on one or more computer-usable storage media (including but not limited to a disk memory, a CD-ROM, an optical memory, and the like) that include computer-usable program code.

This specification is described with reference to the flowcharts and/or block diagrams of the method, the device (system), and the computer program product based on the embodiments of this specification. It should be understood that computer program instructions can be used to implement each procedure and/or each block in the flowcharts and/or the block diagrams and a combination of a procedure and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more procedures in the flowcharts and/or in one or more blocks in the block diagrams.

Alternatively, these computer program instructions can be stored in a computer-readable storage that can instruct a computer or another programmable data processing device to work in a specific manner, so the instructions stored in the computer-readable storage generate an artifact that includes an instruction apparatus. The instruction apparatus implements a specific function in one or more procedures in the flowcharts and/or in one or more blocks in the block diagrams.

Alternatively, these computer program instructions can be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

In a typical configuration, a computing device includes one or more processors (CPUs), one or more input/output interfaces, one or more network interfaces, and one or more storages.

The storage can include a non-persistent memory, a random access memory (RAM), a nonvolatile memory, and/or another form in a computer-readable medium, for example, a read-only memory (ROM) or a flash memory (flash RAM). The storage is an example of the computer-readable medium.

The computer-readable medium includes persistent, non-persistent, removable and non-removable media that can store information by using any method or technology. The information can be computer-readable instructions, a data structure, a program module, or other data. Examples of the computer storage medium include but are not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette, a cassette magnetic disk storage or another magnetic storage device, or any other non-transmission medium. The computer storage medium can be configured to store information that can be accessed by the computing device. As described in this specification, the computer-readable medium does not include computer-readable transitory media such as a modulated data signal and a carrier.

It is worthwhile to further note that the terms "include", "comprise", or any other variant thereof are intended to cover a non-exclusive inclusion, so that a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that the embodiments of this specification can be provided as methods, systems, or computer program products. Therefore, this specification can use a form of hardware only embodiments, software only embodiments, or embodiments with a combination of software and hardware. In addition, this specification can use a form of a computer program product that is implemented on one or more computer-usable storage media (including but not limited to a disk memory, a CD-ROM, an optical memory, and the like) that include computer-usable program code.

This specification can be described in the general context of computer-executable instructions, for example, a program module. Generally, the program module includes a routine, a program, an object, a component, a data structure, and the like for executing a specific task or implementing a specific abstract data type. This specification can alternatively be practiced in distributed computing environments. In the distributed computing environments, tasks are executed by remote processing devices connected through a communication network. In the distributed computing environments, the program module can be located in a local and remote computer storage medium including a storage device.

The above-mentioned descriptions are merely embodiments of this specification, and are not intended to limit this specification. A person skilled in the art can make various modifications and changes to this specification. Any modification, equivalent replacement, or improvement made without departing from the spirit and principle of this specification shall fall within the scope of the claims in this specification.

What is claimed is:

1. A method for accessing an aggregation code payment page, comprising:
    obtaining, by a first server, an access request sent by a terminal, wherein the access request is generated by the terminal by scanning a target aggregation code, and the access request comprises code information of the target aggregation code and a terminal identifier of the terminal;
    obtaining a first redirection address corresponding to the code information, wherein the first redirection address is an access address specified by a second server that manages the target aggregation code;
    sending, to the second server, a payment request for the target aggregation code based on the first redirection address;
    receiving a second request that comprises a third redirection address, wherein the third redirection address points to a management institution of a collection account corresponding to the target aggregation code, and the third redirection address is generated based on the first redirection address;
    accessing the third redirection address, wherein the third redirection address is used to generate a second redirection address;
    receiving a first request used to obtain account information of a payment account, wherein the first request comprises the second redirection address, the second redirection address is generated based on the first redirection address, and the second redirection address corresponds to a payment application provided by the first server;
    sending an authorization code of the payment account to the second redirection address;
    obtaining, from the second server, target page information of a payment page corresponding to the target aggregation code associated with the access request of the terminal; and
    sending the target page information to the terminal based on a single jump of the terminal, wherein the single jump increases a success rate of obtaining the payment page by the terminal by avoiding processing of the first redirection address by the terminal.

2. The method according to claim 1, wherein sending the authorization code of the payment account to the second redirection address specifically comprises:
    determining, based on the terminal identifier of the terminal, a target payment account currently logged in on the terminal;
    determining a target authorization code corresponding to the target payment account; and
    sending the target authorization code to the second redirection address.

3. The method according to claim 1, wherein before obtaining the target page information of the payment page corresponding to the target aggregation code, the method further comprises:
    receiving a payment page address generated based on the authorization code;

wherein obtaining the target page information of the payment page corresponding to the target aggregation code specifically comprises:
obtaining the target page information based on the payment page address.

4. The method according to claim 1, wherein the method further comprises:
obtaining a plurality of historical second redirection addresses received within a preset time period;
determining whether all historical second redirection addresses in the plurality of historical second redirection addresses are consistent; and
upon determining that all the historical second redirection addresses in the plurality of historical second redirection addresses are consistent, storing a historical second redirection address, the code information of the target aggregation code, and a correspondence between the code information and the historical second redirection address in a preset database.

5. The method according to claim 4, wherein before sending the payment request for the target aggregation code based on the first redirection address, the method comprises:
determining, based on the code information, whether the preset database comprises the code information;
upon determining that the preset database comprises the code information, searching the preset database for the historical second redirection address corresponding to the code information; and
sending the authorization code of the payment account based on the historical second redirection address corresponding to the code information;
wherein sending the payment request for the target aggregation code based on the first redirection address specifically comprises:
upon determining that the preset database does not comprise the code information, sending the payment request for the target aggregation code based on the first redirection address.

6. The method according to claim 5, wherein determining whether the preset database comprises the code information specifically comprises:
searching the preset database for the code information based on a regular expression, to obtain a search result; and
determining, based on the search result, whether the preset database comprises the code information.

7. The method according to claim 1, wherein after obtaining, by the first server, the access request sent by the terminal, the method further comprises:
determining, based on the code information, whether the second server that manages the target aggregation code is a server of a preset agency, to obtain a first determining result; and
upon determining that the first determining result indicates that the second server is not the server of the preset agency, returning the code information to the terminal, so that the terminal obtains the target page information based on the code information by using a terminal browser,
wherein sending the payment request for the target aggregation code specifically comprises:
upon determining that the first determining result indicates that the second server is the server of the preset agency, sending the payment request for the target aggregation code based on the first redirection address.

8. The method according to claim 1, wherein the first server is connected to a network in a wired connection manner.

9. The method according to claim 1, wherein the first server communicates with the second server through a preset communication channel, and a bandwidth value of the preset communication channel is greater than or equal to a preset bandwidth value.

10. A device for accessing an aggregation code payment page, comprising a processor and a memory, wherein the memory stores executable instructions that, in response to execution by the processor, cause the processor to:
obtain an access request sent by a terminal, wherein the access request is generated by the terminal by scanning a target aggregation code, and the access request comprises code information of the target aggregation code and a terminal identifier of the terminal;
obtain a first redirection address corresponding to the code information, wherein the first redirection address is an access address specified by a second server that manages the target aggregation code;
send, to the second server, a payment request for the target aggregation code based on the first redirection address;
receive a second request that comprises a third redirection address, wherein the third redirection address points to a management institution of a collection account corresponding to the target aggregation code, and the third redirection address is generated based on the first redirection address;
access the third redirection address, wherein the third redirection address is used to generate a second redirection address;
receive a first request used to obtain account information of a payment account, wherein the first request comprises the second redirection address, the second redirection address is generated based on the first redirection address, and the second redirection address corresponds to a payment application provided by a first server;
send an authorization code of the payment account to the second redirection address;
obtain, from the second server, target page information of a payment page corresponding to the target aggregation code associated with the access request of the terminal; and
send the target page information to the terminal based on a single jump of the terminal, wherein the single jump increases a success rate of obtaining the payment page by the terminal by avoiding processing of the first redirection address by the terminal.

11. A non-transitory computer-readable storage medium, comprising instructions stored therein that, when executed by a processor of a computing device, cause the processor to:
obtain, by a first server, an access request sent by a terminal, wherein the access request is generated by the terminal by scanning a target aggregation code, and the access request comprises code information of the target aggregation code and a terminal identifier of the terminal;
obtain a first redirection address corresponding to the code information, wherein the first redirection address is an access address specified by a second server that manages the target aggregation code;
send, to the second server, a payment request for the target aggregation code based on the first redirection address;

receive a second request that comprises a third redirection address, wherein the third redirection address points to a management institution of a collection account corresponding to the target aggregation code, and the third redirection address is generated based on the first redirection address;

access the third redirection address, wherein the third redirection address is used to generate a second redirection address;

receive a first request used to obtain account information of a payment account, wherein the first request comprises the second redirection address, the second redirection address is generated based on the first redirection address, and the second redirection address corresponds to a payment application provided by the first server;

send an authorization code of the payment account to the second redirection address;

obtain, from the second server, target page information of a payment page corresponding to the target aggregation code associated with the access request of the terminal; and send the target page information to the terminal based on a single jump of the terminal, wherein the single jump increases a success rate of obtaining the payment page by the terminal by avoiding processing of the first redirection address by the terminal.

\* \* \* \* \*